(12) United States Patent
Jung et al.

(10) Patent No.: US 11,258,393 B2
(45) Date of Patent: Feb. 22, 2022

(54) MOTOR DRIVE APPARATUS

(71) Applicant: LG Electronics Inc., Seoul (KR)

(72) Inventors: Hansu Jung, Seoul (KR); Seokhee Cho, Seoul (KR); Jungmoon Je, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 16/629,267

(22) PCT Filed: Jul. 5, 2018

(86) PCT No.: PCT/KR2018/007637
§ 371 (c)(1),
(2) Date: Jan. 7, 2020

(87) PCT Pub. No.: WO2019/009644
PCT Pub. Date: Jan. 10, 2019

(65) Prior Publication Data
US 2020/0162008 A1 May 21, 2020

(30) Foreign Application Priority Data
Jul. 7, 2017 (KR) .................... 10-2017-0086488

(51) Int. Cl.
*H02P 21/36* (2016.01)
*H02P 27/08* (2006.01)
(Continued)

(52) U.S. Cl.
CPC .............. *H02P 27/12* (2013.01); *H02P 21/18* (2016.02); *H02P 21/22* (2016.02); *H02P 21/36* (2016.02); *H02P 27/08* (2013.01)

(58) Field of Classification Search
CPC .. H02P 27/12; H02P 21/36; H02P 6/20; H02P 27/85; H02P 3/08; H02P 3/00;
(Continued)

(56) References Cited

U.S. PATENT DOCUMENTS 4,558,265 A * 12/1985 Hayashida ........... G05B 19/416
318/561
6,885,160 B2 * 4/2005 Takeuchi ............... B62D 11/04
318/139

(Continued)

FOREIGN PATENT DOCUMENTS

EP          1139555       10/2001
JP         2000233095      8/2000
(Continued)

OTHER PUBLICATIONS

Extended European Search Report in European Appln. No. 18827944.2, dated Jun. 25, 2021, 8 pages.

*Primary Examiner* — Bickey Dhakal
(74) *Attorney, Agent, or Firm* — Fish & Richardson P.C.

(57) ABSTRACT

The present invention relates to a motor drive apparatus and, more particularly, to a motor drive apparatus capable of immediately restarting by maintaining sensorless control during a stop operation of a motor. The motor drive apparatus comprises: an inverter for driving a motor by using an AC voltage; and a control unit for controlling operations of a switching element included in the inverter. At this time, when a stop command is input, the control unit decreases a duty ratio of a PWM signal until a present speed of the motor becomes smaller than a predetermined minimum speed, thereby decreasing the revolutions per minute of the motor. Then, when a restart command is input in a state where the duty ratio of the PWM signal is decreased, the control unit can immediately restart the motor by increasing the duty ratio of the PWM signal.

16 Claims, 8 Drawing Sheets

(51) Int. Cl.
*H02P 27/12* (2006.01)
*H02P 21/18* (2016.01)
*H02P 21/22* (2016.01)

(58) Field of Classification Search
CPC .......... H02P 3/18; H02P 21/00; H02P 25/089; H02P 27/085
See application file for complete search history.

(56) References Cited

U.S. PATENT DOCUMENTS

| | | | |
|---|---|---|---|
| 2010/0050703 A1 | 3/2010 | Maekawa et al. | |
| 2013/0069572 A1 | 3/2013 | Maekawa | |
| 2015/0180378 A1* | 6/2015 | Ogawa | H02P 6/17 318/376 |
| 2016/0079887 A1* | 3/2016 | Takano | H02P 1/22 318/431 |
| 2016/0194179 A1* | 7/2016 | Agirman | H02P 27/06 187/289 |

FOREIGN PATENT DOCUMENTS

| | | |
|---|---|---|
| JP | 2002153084 | 5/2002 |
| JP | 2013198235 | 9/2013 |
| KR | 20100041794 | 4/2010 |
| KR | 20130031728 | 3/2013 |
| KR | 20130035175 | 4/2013 |
| KR | 101652061 | 8/2016 |
| KR | 20160098886 | 8/2016 |

\* cited by examiner

MOTOR DRIVE APPARATUS

CROSS-REFERENCE TO RELATED APPLICATIONS

This application is a National Stage application under 35 U.S.C. § 371 of International Application No. PCT/KR2018/007637, filed on Jul. 5, 2018, which claims the benefit of Korean Patent Application No. 10-2017-0086488, filed on Jul. 7, 2017. The disclosures of the prior applications are incorporated by reference in their entirety.

TECHNICAL FIELD

The present disclosure relates to a motor drive apparatus, and, more particularly, to a motor drive apparatus capable of immediately restarting by maintaining sensorless control during a stop operation of a motor.

BACKGROUND

Motors that are small and offer precise control are broadly classified as an AC motor, a DC motor, a brushless DC motor, and a reluctance motor.

Small-size motors have been used in various fields such as fields of AV devices, computers, domestic appliances and housing facilities, industries and the like. In particular, the small-size motors are widely used in the field of domestic appliances. Additionally, in recent years, demand for high-end home appliances has been increased. Accordingly, motors that are small, make less noise, consume less electricity and the like are required.

Among the motors, the BLDC motor, which has no brush and no commutator, generates no mechanical friction loss, no spark or no noise in principle, and is excellent in controlling speeds or torque. Additionally, the BLDC motor triggers no loss caused by control of speeds and is highly efficient as a small motor. Thus, the BLDC motor is usually used for home appliances The BLDC motor may include an inverter that supplies three-phase AC voltages, and a control unit that controls output voltages of the inverter. In this case, the control unit may control the inverter using a PWM control method A sensorless algorithm that does not use a position sensor (e.g., a hall sensor) may be used for the control method of the BLDC motor. In this case, the BLDC motor does not use the position sensor. Accordingly, production costs of motor drive apparatuses may be reduced.

The system including a position sensor of the relater art is capable of immediately restarting by using rotor information of the motor when the motor restarts driving in a state in which the motor is stopped.

However, in a sensorless system that controls a motor using a sensorless algorithm, an additional algorithm is required for a quick restart during a stop of the motor.

DISCLOSURE

Technical Problems

The present disclosure is directed to a motor drive apparatus that can immediately restart at a user's request while maintaining sensorless control even during a stop operation of a motor in a sensorless system.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims

Technical Solutions

A motor drive apparatus according to the present disclosure includes an inverter for driving a motor by using an AC voltage; and a control unit for controlling operations of a switching element included in the inverter. In this case, when a stop command is input, the control unit decreases a duty ratio of a PWM signal until a present speed of the motor becomes smaller than a predetermined minimum speed, thereby decreasing the revolutions per minute of the motor. Then, when a restart command is input in a state where the duty ratio of the PWM signal is decreased, the control unit can immediately restart the motor by increasing the duty ratio of the PWM signal.

Advantageous Effects

A motor drive apparatus according to the present disclosure may immediately restart a motor at a user's request by maintaining sensorless control during a stop operation. By doing so, time taken by the motor to respond to a request for a restart may be minimized, and stability in control of the motor may be improved.

Detailed effects of the present disclosure are described together with the above-described effects in the detailed description of the disclosure

DETAILED DESCRIPTION

Figure 1:
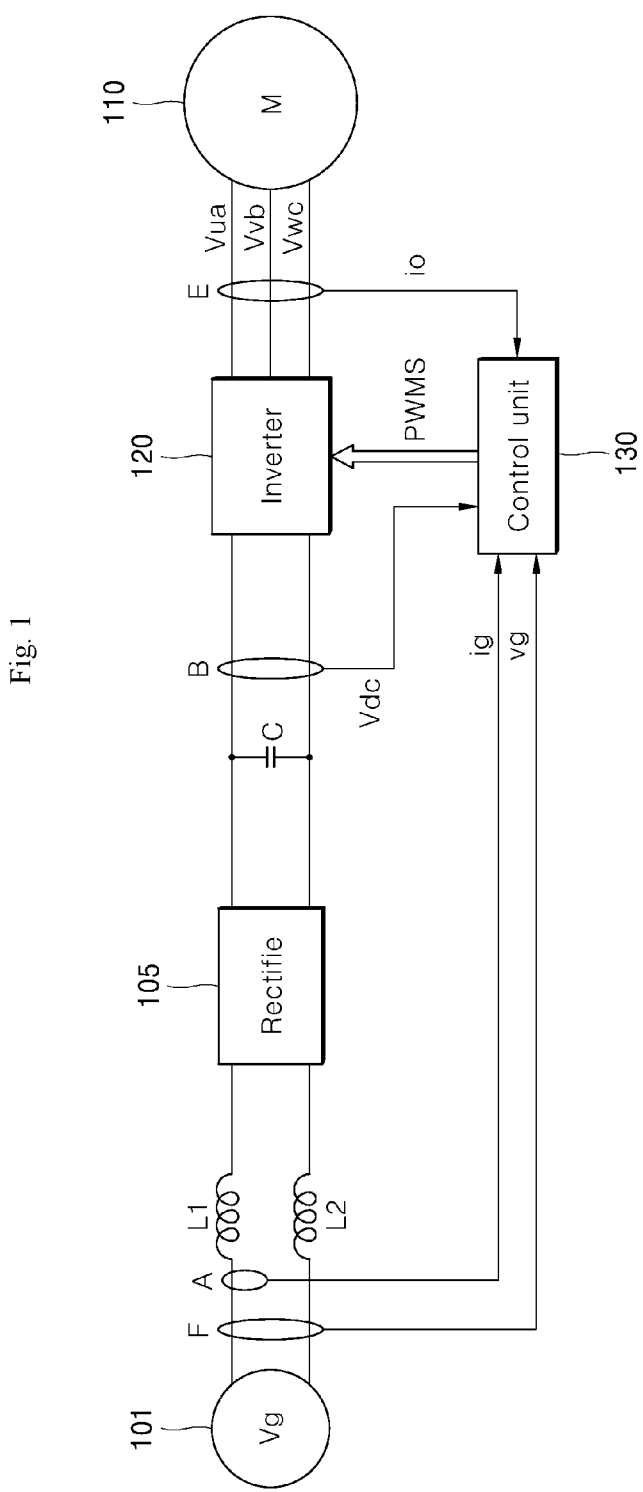
FIG. 1 is a block diagram illustrating a motor drive apparatus according to an embodiment of the present disclosure.

Advantages and features of the present disclosure, and a method for achieving the same may be clearly understood by referring to the following embodiments that are specifically described with reference to the accompanying drawings. The present disclosure, however, may be implemented in various different forms, and should not be construed as being limited only to the embodiments set forth herein. Rather, these embodiments are provided as examples so that the present disclosure will be thorough and complete and will fully convey the subject matter of the present disclosure to one having ordinary skill in the art to which the present disclosure pertains. The present invention should be defined by the scope of the appended claims. Throughout the drawings and description, like reference numerals denote like elements.

Unless otherwise defined, all the terms (including technical and scientific terms) used herein have the same meaning as commonly understood by one having ordinary skill in the art. It will be further understood that terms such as those defined in commonly used dictionaries should not be interpreted in an idealized sense or in an excessive way unless explicitly so defined herein.

Below, a motor drive apparatus according to an embodiment of the present disclosure is described with reference to FIGS. 1 to 8.

FIG. 1 is a block diagram illustrating a motor drive apparatus according to an embodiment of the present disclosure.

Referring to FIG. 1, the motor drive apparatus according to an embodiment of the present disclosure may include a motor 110, an inverter 120, and control unit 130

The motor 110 may include a stator around which three-phase coils (not illustrated) are wound, and a rotor placed in the stator and rotated by a magnetic field generated in the three-phase coils.

When the three-phase coils are supplied with three-phase AC voltages (Vua, Vvb, Vwc) from the inverter 120, in the motor 110, a permanent magnet included in the rotor is rotated according to a magnetic field generated in the three-phase coils However, the motor 110 according to an embodiment of the present disclosure is not limited to a three-phase motor operated by three-phase coils. The motor 110, for example, may further include a single-phase motor using a single-phase coil. Below, features of the present disclosure are described in relation to a three-phase motor The motor 110 may include an induction motor, a blushless DC (BLDC) motor, a reluctance motor and the like. The motor 110, for example, may include a surface-mounted permanent-magnet synchronous motor (SMPMSM), an interior permanent magnet synchronous motor (IPMSM), a synchronous reluctance motor (Synrm) and the like The inverter 120 may include three-phase switching elements. When an operation control signal (referred to as "pulse width modulation (PWM) signal") supplied to the control unit 130 is input, the three-phase switching elements may perform switch-on and switch-off operations, may convert an input DC voltage (Vdc) into three-phase AC voltages (Vua, Vvb, Vwc), and may supply the three-phase AC voltages to the three-phase coils. The three-phase switching elements are specifically described hereunder with reference to FIG. 3

When inputting a target command value, the control unit 130 may output a PWM signal (PWMS) that determines a switch-on period for a switch-on operation and a switch-off period for a switch-off operation of each three-phase switching element on the basis of the target command value and an electrical angle position of the rotor The motor drive apparatus may further include an input current detector (A), a DC terminal voltage detector (B), a DC terminal capacitor (C), a motor current detector (E), an input voltage detector (F), an inductor (L1, L2) and the like. However, the present disclosure is not limited, and some of the above-described components may be omitted.

The input current detector (A) may detect input currents (ig) input from a commercial AC power source 101. To this end, a current transformer (CT), a shunt resistance and the like may be used as the input current detector (A). Detected input currents (ig), which are a pulse-type discrete signal, may be input to the control unit 130 for control of electric power.

The input voltage detector (F) may detect input voltages (vg) input from the commercial AC power source 101. To this end, the input voltage detector (F) may include a resistance element, an amplifier and the like. Detected input voltages (vg), which are a pulse-type discrete signal, may be input to the control unit 130 for control of electric power.

The inductor (L1, L2) may be placed between the commercial AC power source 101 and a rectifier 105, and may perform an operation of removing noise and the like.

The rectifier 105 rectifies the commercial AC power source 101 having passed through the inductor (L1, L2) and outputs the rectified commercial AC power source 101. The rectifier 105, for example, may be provided with a full bridge diode in which four diodes are connected but may be modified and applied in various ways.

The capacitor (C) stores input power. In the drawings, a single element is illustrated as the DC terminal capacitor (C), but a plurality elements may also be provided to ensure stability of elements.

The DC terminal voltage detector (B) may detect voltages (Vdc) of direct current terminals that are both terminals of the capacitor (C). To this end, the DC terminal voltage detector (B) may include a resistance element, an amplifier and the like. Detected DC terminal voltages (Vdc), which are a pulse-type discrete signal, may be input to the control unit 130 for generation of a PWM signal (PWMS).

The motor current detector (E) detects output currents (io) flowing between the inverter 120 and the three-phase motor 110. That is, the motor current detector (E) detects electric currents flowing through the three-phase motor 110. The motor current detector (E) may detect all output currents (ia, ib, ic) of each phase, and may also detect output currents of two phases using three-phase balancing.

The motor current detector (E) may be placed between the inverter 120 and the three-phase motor 110, and a current transformer (CT), a shunt resistance and the like may be used as the motor current detector (E) for detection of electric currents.

Detected output currents (io), which are a pulse-type discrete signal, may be supplied to the control unit 130, and a PWM signal (PWMS) may be generated based on the detected output currents (io). Below, the detected output currents (io) are described as output currents of three phases (ia,ib,ic).

Accordingly, the control unit 130 may control operations of the inverter 120 using input currents (ig) detected by the input current detector (A), input voltages (vg) detected by the input voltage detector (F), DC terminal voltages (Vdc) detected by the DC terminal voltage detector (B), and output currents (io) detected by the motor current detector (E).

Figure 2:
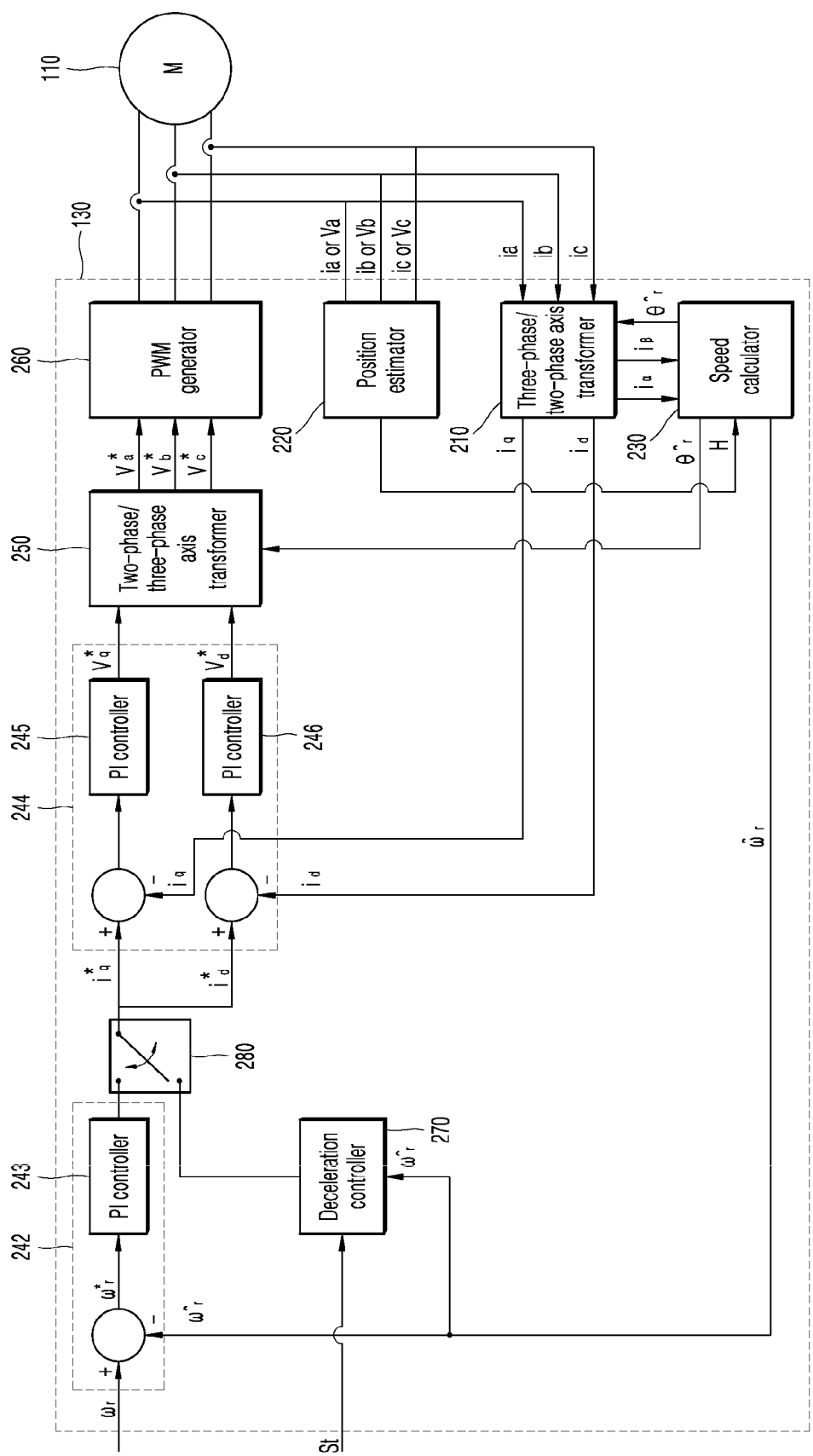
FIG. 2 is a block diagram illustrating components of the control unit in FIG. 1.

FIG. 2 is a block diagram illustrating components of the control unit in FIG. 1.

Referring to FIG. 2, the control unit 130 may include a three-phase/two-phase axis transformer 210, a position estimator 220, a speed calculator 230, a command value generator 240, a two-phase/three-phase axis transformer 250, a signal generator (referred to as "PWM generator" 260), a deceleration controller 270, and a switch 280.

The three-phase/two-phase axis transformer 210 receives three-phase currents (ia, ib, ic) output from the motor 110 and transforms the three-phase currents (ia, ib, ic) into two-phase currents (i$\alpha$, i$\beta$) of the stationary coordinate system.

Additionally, the three-phase/two-phase axis transformer 210 may transform the two-phase currents (iα, iβ) of the stationary coordinate system into two-phase currents (id, iq) of the rotary coordinate system.

The position estimator 220 may detect at least one of three-phase currents (ia, ib, ic) and three-phase voltages (Va, Vb, Vc), and may estimate a position (H) of the rotor included in the motor 110.

The speed calculator 230 may calculate a present speed ($\hat{\omega}_r$) of the rotor on the basis of at least one of the position (H) estimated by the position estimator 220 and the three-phase voltages (Va, Vb, Vc). That is, the speed calculator 230 may calculate the current position ($\hat{\omega}_r$) by dividing the position (H) by time.

Additionally, the speed calculator 230 may output an electrical angle position ($\hat{\theta}_r$) calculated on the basis of the position (H), and the calculated present speed ($\hat{\omega}_r$).

The command value generator 240 may include a current command generator 242 and a voltage command generator 244.

The current command generator 242 calculates a speed command value ($\omega^*_r$) on the basis of a command speed ($\omega_r$) corresponding to the calculated present speed ($\hat{\omega}_r$) and the input target command value.

Then the current command generator 242 generates a current command value ($i^*_q$) on the basis of the speed command value ($\omega^*_r$).

The current command generator 242, for example, may perform PI control in a PI controller 243 on the basis of the speed command value ($\omega^*_r$) that is a difference between the present speed ($\hat{\omega}_r$) and the command speed ($\omega_r$), and may generate a current command value ($i^*_q$). The current command generator 242 may also generate a d-axis current command value ($i^*_d$) when generating a q-axis current command value ($i^*_q$). A value of the d-axis current command value ($i^*_d$) may be set to 0.

Additionally, the current command generator 242 may be further provide with a limiter (not illustrated) that limits a level of a current command value ($i^*_q$) such that the current command value ($i^*_q$) does not exceed an allowable range.

The switch 280 may select any one of the current command generator 242 and the deceleration controller 270, and may deliver a signal output from a selected element to the voltage command generator 244. In this case, the output signal may include current command values ($i^*_d$, $i^*_q$).

That is, the current command values ($i^*_d$, $i^*_q$) generated by the current command generator 242 passes through the switch 280 and may be delivered to the voltage command generator 244. Herein, when the control unit 130 receives an acceleration operation command or a maintenance operation command, the switch 280 may connect the current command generator 242 and the voltage command generator 244.

When the control unit 130 receives a stop command (St), the switch 280 may connect the deceleration controller 270 and the voltage command generator 244.

Herein, the deceleration controller 270 may receive the present speed ($\hat{\omega}_r$) together with the stop command (St), and may operate on the basis of a sensorless algorithm.

Specifically, when the stop command (St) is input, the deceleration controller 270 may output a current command value ($i^*_d$, $i^*_q$) that allows a duty ratio of the PWM signal (PWMS) to be reduced until the present speed ($\hat{\omega}_r$) becomes smaller than a predetermined minimum speed ($\omega_{r\_limit}$). The above-described control method is referred to as zero current control.

Under the zero current control, the control unit 130 outputs a reduced duty ratio of PWM signals (PWMS). Accordingly, the control unit 130 may maintain continuity of sensorless control of the motor 110.

When the sensorless control is maintained, the control unit 130 may estimate a position of magnetic polarity of the motor 110. Accordingly, when a restart command is input, the motor 110 may immediately restart.

Conversely, when the sensorless control is not maintained, the control unit 130 may not estimate a position of magnetic polarity of the motor 110. Accordingly, the motor 110 may restart only after the motor 110 stops.

Next, when a restart command is input to the control unit 130 in a state in which the duty ratio of the PWM signal (PWMS) is reduced, the deceleration controller 270 may output a current command value ($i^*_d$, $i^*_q$) that allows the duty ratio of the PWM signal (PWMS) to be increased.

When the present speed ($\hat{\omega}_r$) becomes smaller than the predetermined minimum speed ($\omega_{r\_limit}$), the deceleration controller 270 may output a current command value ($i^*_d$, $i^*_q$) that allows the duty ratio of the PWM signal (PWMS) to become 0 for forcible braking. Detailed description in relation to this is provided hereunder with reference to FIG. 4.

The voltage command generator 244 generates d-axis and q-axis voltage command values ($v^*_d$, $v^*_q$) on the basis of the d-axis and q-axis currents ($i_d$, $i_q$) axis-transformed into the rotary coordinate system, and on the basis of the current command values ($i^*_d$, $i^*_q$) in the current command generator 242 and the like.

The voltage command generator 244, for example, may perform PI control in the PI controller 245 on the basis of a difference between the q-axis current ($i_q$), and the q-axis current command value ($i^*_q$), and may generate a q-axis voltage command value ($v^*_q$).

Additionally, the voltage command generator 244 may perform PI control in the PI controller 246 on the basis of a difference between the d-axis current ($i_d$), and the d-axis current command value ($i^*_d$), and may generate a d-axis voltage command value ($v^*_d$).

A value of the d-axis voltage command value ($V^*_d$) may be set to 0 in response to a value of the d-axis current command value ($I^*_d$) when the value of the d-axis current command value ($I^*_d$) is set to 0.

The voltage command generator 244 may be further provided with a limiter (not illustrated) that limits a level of the d-axis and q-axis voltage command values ($v^*_d$, $v^*_q$) such that the d-axis and q-axis voltage command values ($v^*_d$, $v^*_q$) do not exceed an allowable range.

The generated d-axis and q-axis voltage command values ($v^*_d$, $v^*_q$) are input to the two-phase/three-phase axis transformer 250.

The two-phase/three-phase axis transformer 250 receives the position ($\hat{\theta}_r$) calculated by the speed calculator 230, and the d-axis and q-axis voltage command values ($v^*_d$, $v^*_q$), and performs axis-transformation.

First, the two-phase/three-phase axis transformer 250 performs transformation from a two-phase rotary coordinate system into a two-phase stationary coordinate system. In this case, the electrical angle position ($\hat{\theta}_r$) calculated by the speed calculator 230 may be used.

Additionally, the two-phase/three-phase axis transformer 250 performs transformation from the two-phase stationary coordinate system into a three-phase stationary coordinate system. Through the transformation, the two-phase/three-phase axis transformer 250 outputs three-phase output voltage command values (v*a, v*b, v*c).

The PWM generator 260 generates and outputs a PWM signal (PWMS) for an inverter according to a pulse width modulation (PWM) method on the basis of the three-phase output voltage command values (v*a,v*b,v*c).

The PWM signal (PWMS) may be transformed into a gate drive signal in a gate driver (not illustrated), and may be input to gates of the three-phase switching elements in the inverter 120. By doing so, the three-phase switching elements in the inverter 120 perform switching operations.

Herein, the PWM generator 260 may vary the switch-on period and switch-off period of the PWM signal (PWMS) on the basis of the above-described electrical angle position ($\theta\hat{}_r$) and three-phase voltages (Va, Vb, Vc), and may control switching operations of the three-phase switching elements.

In the PWM generator 260, a plurality of algorithms for generating a PWM signal (PWMS) are set. The PWM generator 260 may generate an output voltage command vector on the basis of the three-phase output voltage command values (v*a,v*b,v*c).

Though not explicitly illustrated in the drawing, in another embodiment of the present disclosure, the PWM generator 260 may receive the present speed ($\omega\hat{}_r$) together with the stop command (St), and may operate on the basis of the sensorless algorithms. In this case, the above-described deceleration controller 270 and the switch 280 may be omitted.

Specifically, when the stop command (St) is input, the PWM generator 260 may perform the zero current control that allows a duty ratio of the PWM signal (PWMS) to be reduced until the present speed ($\omega\hat{}_r$) becomes smaller than the predetermined minimum speed ($\omega_{r\_limit}$). Under the zero current control, the control unit 130 outputs a reduced duty ratio of PWM signals (PWMS). Accordingly, the control unit 130 may maintain continuity of sensorless control of the motor 110.

Next, when a restart command is input to the control unit 130 in a state in which the duty ratio of the PWM signal (PWMS) is reduced, the PWM generator 260 may reincrease the duty ratio of the PWM signal (PWMS).

When the present speed ($\omega\hat{}_r$) becomes smaller than the predetermined minimum speed ($\omega_{r\_limit}$), the PWM generator 260 may make the duty ratio of the PWM signal (PWMS) 0, for forcible braking. Detailed description in relation to this is provided hereunder with reference to FIG. 4. However, the present disclosure in not limited, and the control unit 130 may perform the sensorless algorithms using other components.

Figure 3:
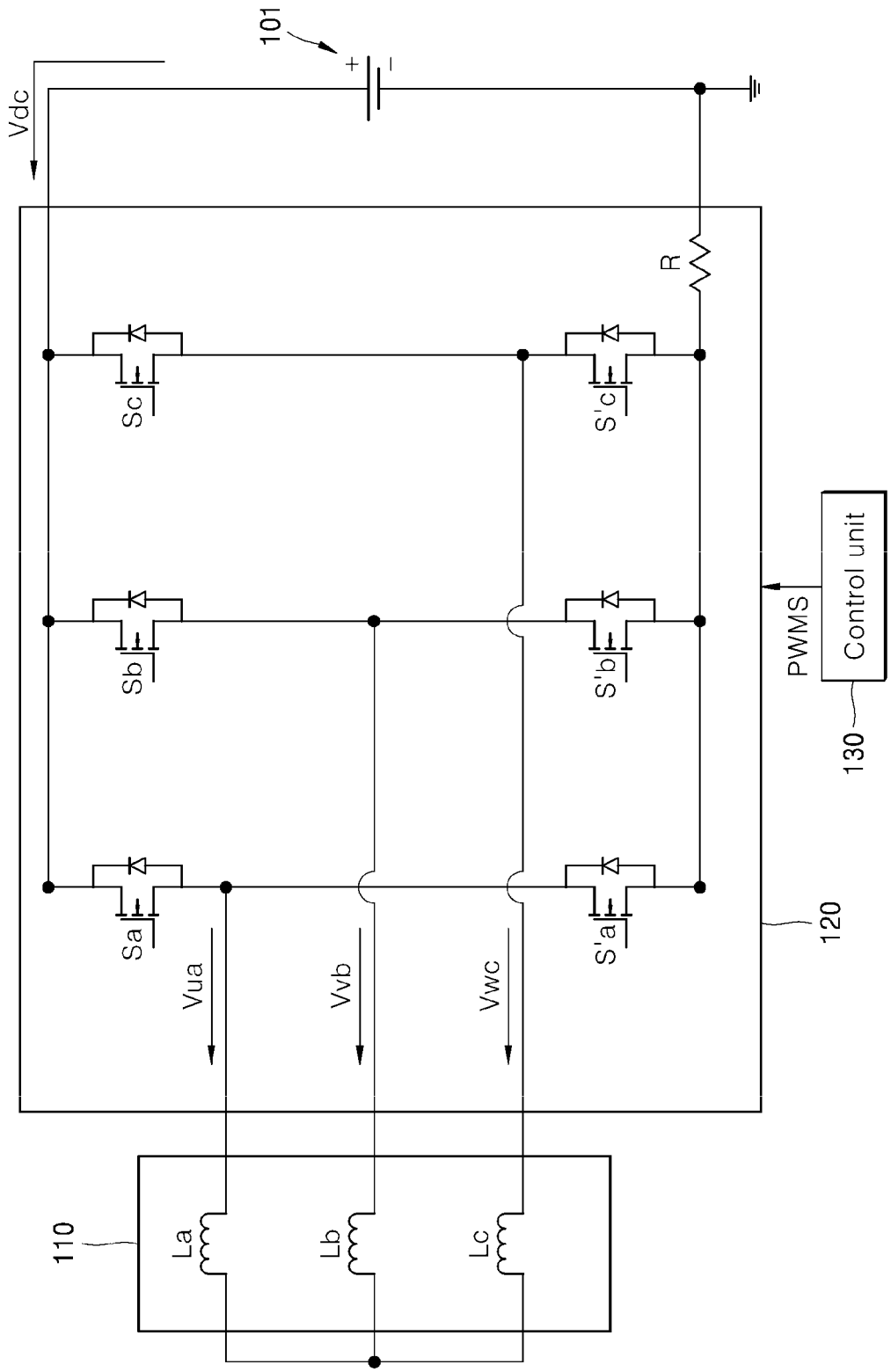
FIG. 3 is a circuit diagram illustrating the inverter in FIG. 1.

FIG. 3 is a circuit diagram illustrating the inverter in FIG. 1.

Referring to FIG. 3, the inverter 120 according to an embodiment of the present disclosure may include three-phase switching elements, and may convert input DC voltages (Vdc) into three-phase AC voltages (Vua, Vvb, Vwc) having a predetermined frequency or a predetermined duty, and may output the three-phase AC voltages (Vua, Vvb, Vwc) to the motor 110, by performing switch-on and switch-off operations through a PWM signal (PWMS) supplied from the control unit 130.

The three-phase switching elements include first to third upper arm switches (Sa, Sb, Sc) and first to third lower arm switches (S'a, S'b, S'b) that are connected in series with each other and that are provided in pairs, and three pairs of first to third upper arm switches and first to third lower arm switches (Sa&S'a, Sb&S'b, Sc&S'c) in total may be connected in parallel with each other.

That is, the first upper and lower arm switches (Sa, S'a) supply a first-phase AC voltage (Vua) among the three-phase AC voltages (Vua, Vvb, Vwc) to a first-phase coil (La) among the three-phase coils (La, Lb, Lc) of the motor 110.

Additionally, the second upper and lower arm switches (Sb, S'b) may supply a second-phase AC voltage (Vvb) to a second-phase coil (Lb), and the third upper and lower arm switches (Sc, S'c) may supply a third-phase AC voltage (Vwc) to a third-phase coil (Lc).

Each of the first to third upper arm switches (Sa, Sb, Sc) and the first to third lower arm switches (S'a, S'b, S'b) may perform a switch-on-and-off operation once per one rotation of the rotor according to an input PWM signal (PWMS), may supply three-phase AC voltages (Vua, Vvb, Vwc) respectively to the three-phase coils (La, Lb, Lc), and may control operations of the motor 110.

The control unit 130 may deliver a PWM signal (PWMS) respectively to the first to third upper arm switches (Sa, Sb, Sc) and the first to third lower arm switches (S'a, S'b, S'b), and may control the inverter 120 such that three-phase AC voltages (Vua, Vvb, Vwc) are supplied to the three-phase coils (La, Lb, Lc).

Additionally, the control unit 130 may deliver a PWM signal (PWMS) under the zero current control, and may control the inverter 120 such that the three-phase AC voltages (Vua, Vvb, Vwc) are delivered to the three-phase coils (La, Lb, Lc) even during deceleration driving. In this case, magnitude of electric currents flowing through the three-phase coils (La, Lb, Lc) may become smaller than magnitude of electric currents prior to the deceleration driving.

Additionally, the control unit 130 may output a PWM signal (PWMS) for forcibly braking the motor 110, and may control the first to third upper arm switches (Sa, Sb, Sc) and the first to third lower arm switches (S'a, S'b, S'b).

Specifically, forcible braking involves dynamic braking and reserve force braking.

The dynamic braking is a method of stopping the motor 110 quickly by generating a counter electromotive force in the motor 110. In this case, the control unit 130 may switch off all the first to third upper arm switches (Sa, Sb, Sc) and may switch on all the first to third lower arm switches (S'a, S'b, S'b).

The reserve force braking is a method of reducing speed through a natural reduction operation caused by a mechanical loss (e.g., a frictional force or a windage loss) by freely wheeling the motor 110. In this case, the control unit 130 may switch off all the first to third upper arm switches (Sa, Sb, Sc) and all the first to third lower arm switches (S'a, S'b, S'b).

However, during the forcible braking operation, the control unit 130 may not acquire voltage or current information from the sensorless system, and may not maintain sensorless control. In the motor drive apparatus according to an embodiment of the present disclosure, sensorless control may be maintained through the zero current control until the present speed ($\omega\hat{}_r$) becomes smaller than the predetermined minimum speed ($\omega_{r\_limit}$). Additionally, when the present speed ($\omega\hat{}_r$) becomes smaller than the predetermined minimum speed ($\omega_{r\_limit}$), the motor drive apparatus may minimize a deceleration period through forcible braking.

When a restart command is input during the zero current control, i.e., in a state in which the sensorless control is maintained, the motor according to an embodiment of the present disclosure may immediately restart.

When a restart command is input during a forcible braking operation, i.e., in a state in which the sensorless control is not maintained, the motor may restart after the motor 110 is stopped by the forcible braking. In this case, the forcible braking is a relatively quick braking method. Accordingly, the present disclosure may immediately perform a restart operation while minimizing a stop period. The stop period, for example, may be less than 1 second, but the present disclosure is not limited.

Below, operations of the motor drive apparatus according to sensorless algorithms are specifically described with reference to FIG. 4.

Figure 4:
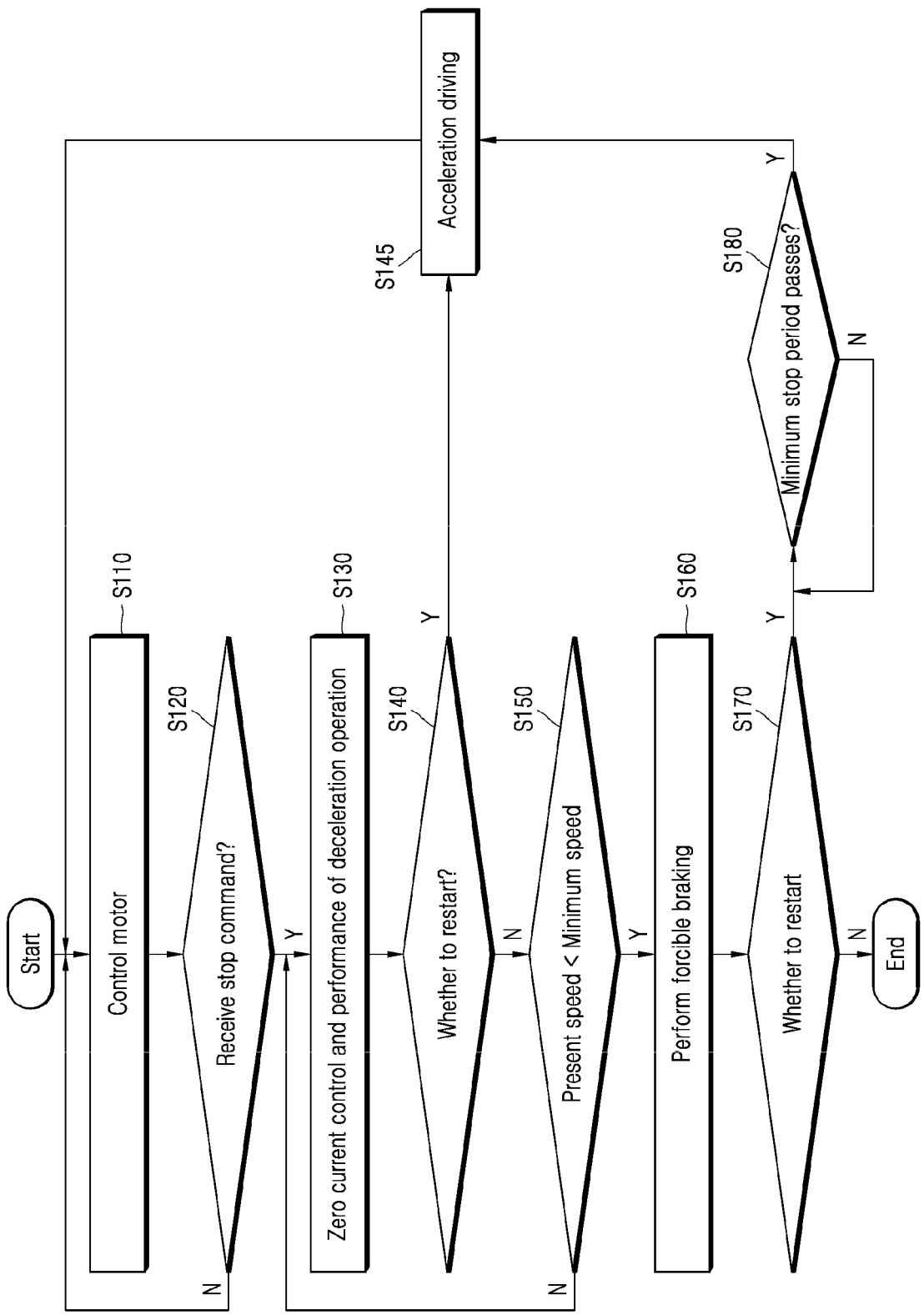
FIG. 4 is a flow chart for describing operations of a motor drive apparatus according to an embodiment of the present disclosure.
Figure 5:
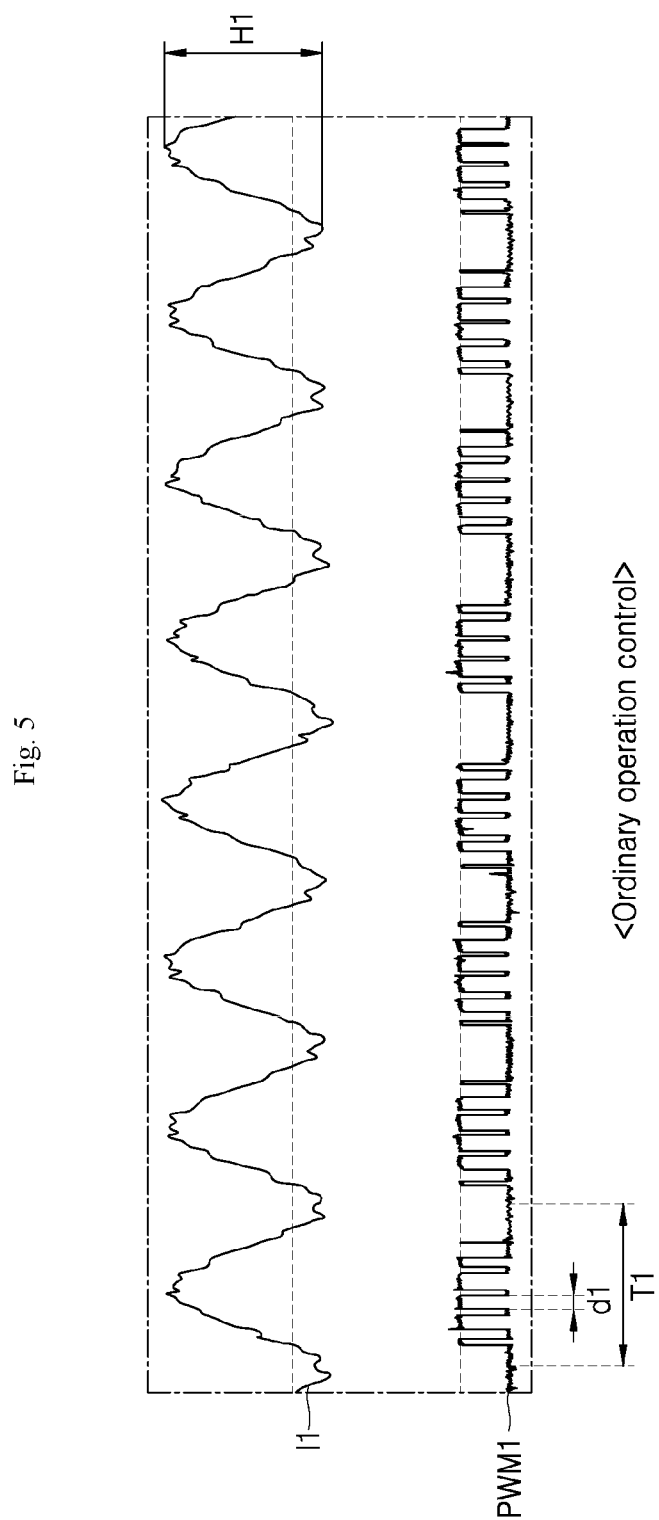
FIGS. 5 to 7 are graphs illustrating waveforms of a PWM signal according to operations of a motor drive apparatus.
Figure 6:
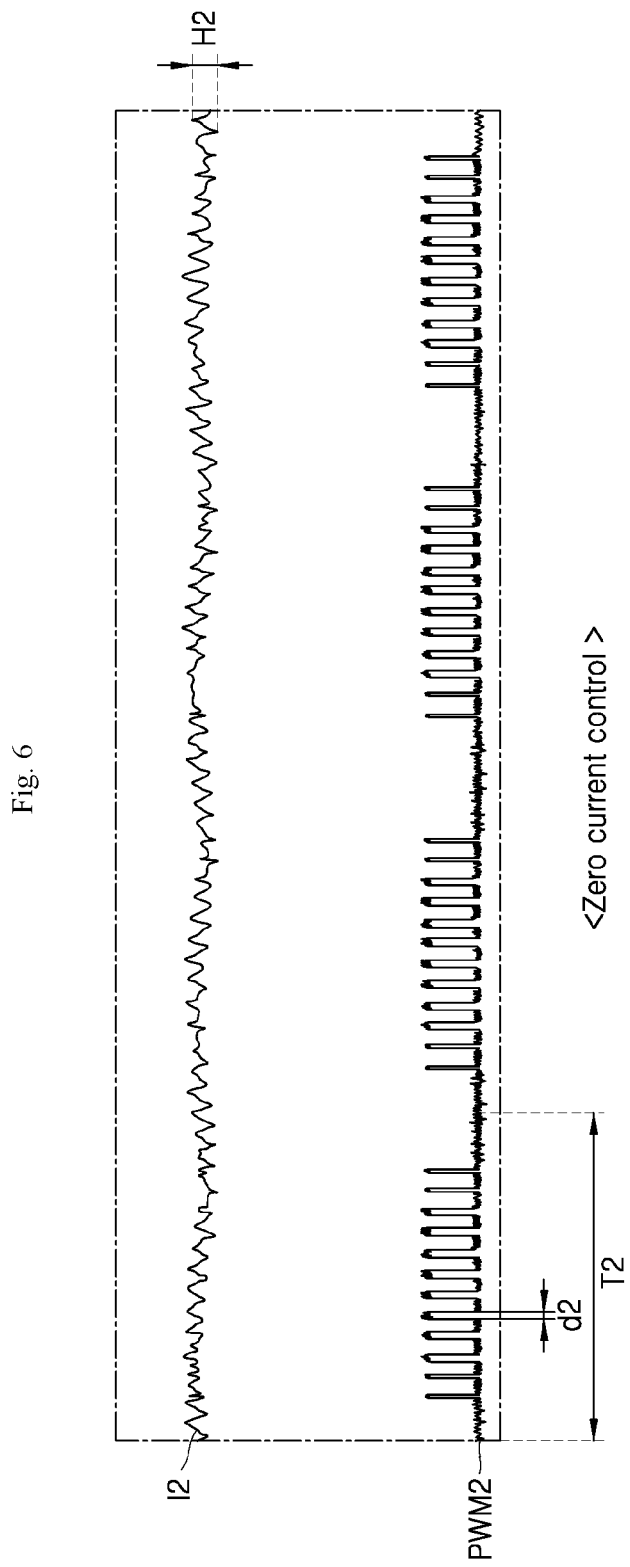
Figure 7:
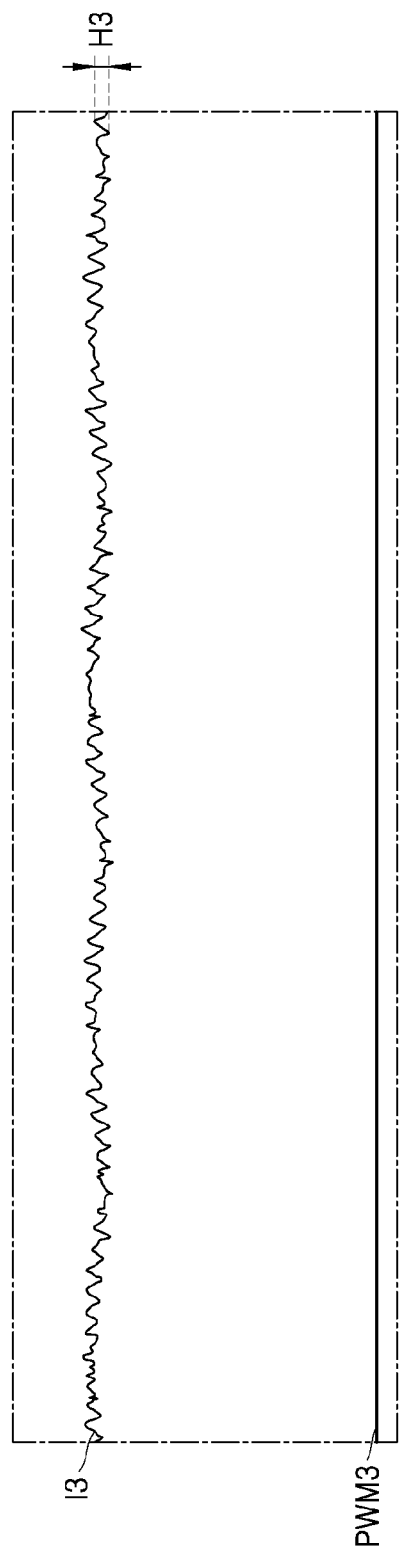

FIG. 4 is a flow chart for describing operations of a motor drive apparatus according to an embodiment of the present disclosure. FIGS. 5 to 7 are graphs illustrating waveforms of a PWM signal according to operations of a motor drive apparatus. Below, for convenience of description, description of details the same as the details described above is omitted, and differences are mainly described.

Referring to FIG. 4, the motor drive apparatus according to an embodiment of the present disclosure performs a motor control operation (S110). The motor 110 may perform acceleration driving or deceleration driving on the basis of a command speed ($\omega_r$)

Next, the control unit 130 receives a stop command (St) (S120). In this case, the stop command (St) may be generated at a user's request or instruction.

Next, the control unit 130 performs a deceleration operation of the motor 110 through zero current control (S130). The zero current control, as described above, is an operation of reducing a duty ratio of a PWM signal (PWMS) used to control the motor 110. Through the zero current control, the control unit 130 may perform a deceleration operation while maintaining sensorless control.

Below, description is provided with reference to FIGS. 5 and 6 to describe a change in duty ratios of a PWM signal (PWMS) during zero current control.

FIG. 5 shows electric currents (I1) delivered to the first-phase coil of the motor 110, and a PWM signal (PWM1) for controlling the electric currents (I1) at the time of ordinary operations.

FIG. 6 shows electric currents (I2) delivered to the first-phase coil, and a PWM signal (PWM2) for controlling the electric currents (I2) at the time of zero current control.

Magnitude (H2) of electric currents (I2) delivered to the first-phase coil at the time of zero current control may be smaller than magnitude (H1) of electric currents (I1) delivered to the first-phase coil at the time of ordinary operations. Likewise, a duty ratio (d2) of the PWM signal (PWM2) at the time of zero current control may be smaller than a duty ratio (d1)) of the PWM signal (PWM1) at the time of ordinary operations. In this case, a cycle (T2) of the PWM signal (PWM2) at the time of zero current control may be longer than a cycle (T1) of the PWM signal (PWM1) at the time of ordinary operations. However, the present disclosure is not limited.

By doing so, the control unit 130 may maintain sensorless control while performing a deceleration operation of reducing speeds of rotation of the motor 110.

Next, referring back to FIG. 4, the control unit 130 confirms whether a restart command is received (S140).

If a restart command is received during the zero current control, the control unit 130 accelerates the motor 110 by reincreasing the duty ratio of the PWM signal (PWMS) (S145). The control unit 130 may immediately perform a restart operation because sensorless control is being maintained.

If a restart command is not received during the zero current control, the control unit 130 determines whether the present speed ($\hat{\omega}_r$) of the motor 110 is smaller than the predetermined minimum speed ($\omega_{r\_limit}$) (S150).

Herein, the minimum speed ($\omega_{r\_limit}$) may be smaller than a maximum speed of the motor 110 and may be a minimum speed at which sensorless operations are possible. A value of the minimum speed ($\omega_{r\_limit}$), for example, may be a value less than half the maximum speed of the motor 110.

If the present speed ($\hat{\omega}_r$) of the motor 110 is not smaller than the predetermined minimum speed ($\omega_{r\_limit}$), the control unit 130 may repeat steps 140 to 150 that are described above.

Conversely, if the present speed ($\hat{\omega}_r$) of the motor 110 is smaller than the predetermined minimum speed ($\omega_{r\_limit}$), the control unit 130 performs a forcible braking operation (S160). The forcible braking operation may involve the above-described dynamic braking or reserve force braking. Repeated description in relation to this is avoided. Sensorless control may not be maintained during the forcible braking operation.

Description is provided with reference to FIGS. 6 and 7 to describe a change in duty ratios of a PWM signal (PWMS) during a forcible braking operation.

FIG. 6 shows electric currents (I2) delivered to the first-phase coil, and a PWM signal (PWM2) for controlling the electric currents (I2) at the time of zero current control.

FIG. 7 shows electric currents (I3) delivered to the first-phase coil of the motor 110, and a PWM signal (PWM3) for controlling the electric currents (I3) at the time of forcible braking.

Magnitude (H3) of electric currents (I3) delivered to the first-phase coil at the time of forcible braking may be smaller than magnitude (H2) of electric currents (I2) delivered to the first-phase coil at the time of zero current control.

Additionally, a duty ratio of the PWM signal (PWM3) at the time of forcible braking may be smaller than a duty ratio (d2) of the PWM signal (PWM2) at the time of zero current control. In this case, the PWM signal (PWM3) at the time of forcible braking may be 0. However, the present disclosure is not limited.

At the time of the forcible braking, the control unit 130 may not maintain sensorless control of the motor 110. Accordingly, the control unit 130 may minimize braking time of the motor 110 through the forcible braking operation.

Next, referring back to FIG. 4, the control unit 130 confirms whether a restart command is received (S170).

If a restart command is not received during the forcible braking operation, the motor 110 stops.

If a restart command is received during the forcible braking operation, the control unit 130 determines whether a minimum stop period passes after receiving the stop command (St) (S180). Herein, the minimum stop period may denote a time point at which a preset period passes from the moment when the control unit 130 receives a stop command (St). The minimum stop period, for example, may be set to one second. However, the present disclosure is not limited.

When the minimum stop period passes from the moment when a stop command (St) is received, the motor 110 may go through sensorless control, and then may stop through a forcible braking operation.

Next, when the minimum stop period passes after the control unit 130 receives a stop command (St), the control unit 130 supplies a PWM signal (PWMS) that is output at the time of ordinary operations, and accelerates the motor 110 (S145). That is, the control unit 130 may restart the motor 110. In this case, the motor 110 may restart in a state in which the motor 110 is completely stopped. Accordingly, the control unit 130 may maintain continuity of control of the motor 110.

In another embodiment of the present disclosure, step 180 may be omitted. In this case, when the motor 110 is stopped, the control unit 130 may restart the motor 110 regardless of the minimum stop period. However, the present disclosure is not limited.

By doing so, the motor drive apparatus according to embodiments of the present disclosure may maintain the sensorless control during a stop operation, thereby immediately restarting a motor at a user's request.

Additionally, the motor drive apparatus may reduce a forcible braking operation section in which the sensorless control is not maintained. When a restart command is input during the forcible braking operation, the motor may perform a restart operation after the minimum stop period passes, thereby maintaining continuity of control of the motor 110.

By doing so, the motor drive apparatus of the present disclosure may reduce time taken by the motor to respond to a user's request for a restart, and may improve stability in an operation of controlling the motor.

Figure 8:
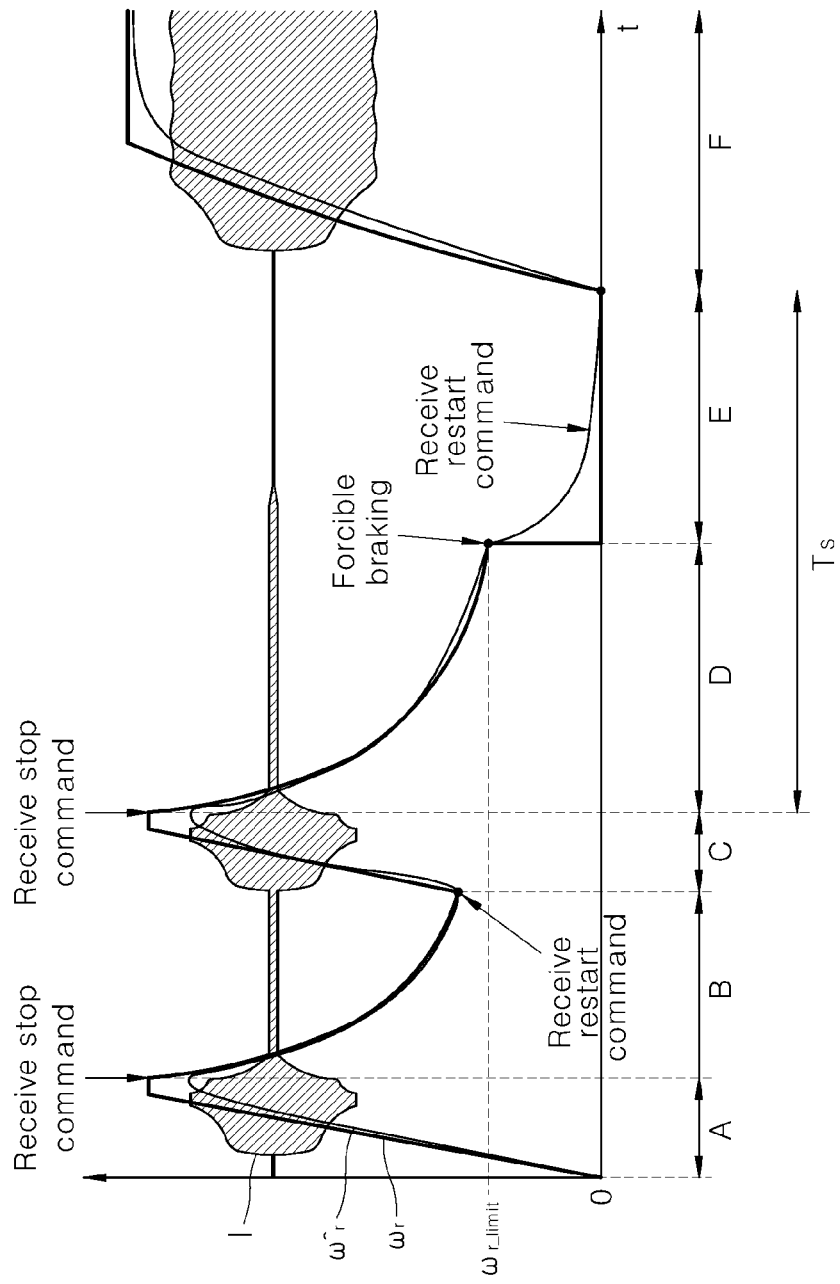
FIG. 8 is a graph for describing operations of a motor drive apparatus according to an embodiment of the present disclosure.

FIG. 8 is a graph for describing operations of a motor drive apparatus according to an embodiment of the present disclosure.

FIG. 8 shows a command speed ($\omega_r$), a present speed ($\omega^\wedge_r$), and phase currents (I) used to operate the motor 110, at the time of operations of the motor drive apparatus.

Section A denotes an acceleration section in which a command speed ($\omega_r$) is increased. As the command speed ($\omega_r$) is increased, a present speed ($\omega^\wedge_r$) of the motor 110 is also increased. When the present speed ($\omega^\wedge_r$) of the motor 110 reaches the target speed, the motor 110 may maintain a constant speed. As the command speed ($\omega_r$) is increased, magnitude of phase currents (I) may be increased, and the phase currents (I) may be input to the motor 110.

Section B denotes a section in which sensorless control is performed through zero current control after a stop command (St) is input to the control unit 130. When the stop command (St) is input to the control unit 130, the command speed ($\omega_r$) is decreased, and the present speed ($\omega^\wedge_r$) is also decreased along with the command speed ($\omega_r$). However, within a range in which the command speed ($\omega_r$) is greater than a predetermined minimum speed ($\omega_{r\_limit}$), the control unit 130 may perform deceleration driving while maintaining the sensorless control. Specifically, the control unit 130 may perform the deceleration driving while maintaining the sensorless control by reducing a duty ratio of a PWM signal (PWMS).

Section C denotes a section in which the motor 110 restarts when the control unit 130 receives a restart command during the zero current control. The control unit 130 may maintain the sensorless control through the zero current control. When the sensorless control is maintained, the control unit 130 may estimate a position of magnetic polarity of the motor 110. Accordingly, when the restart command is input, the motor 110 may immediately restart. Thus, the control unit 130 may immediately respond to the restart command and may accelerates the motor 110.

Like section B, section D denotes a section in which the control unit 130 performs the sensorless control through the zero current control after the stop signal (St) is input to the control unit 130. Within a range in which the command speed ($\omega_r$) is greater than the predetermined minimum speed ($\omega_{r\_limit}$), the control unit 130 may perform the deceleration driving while maintaining the sensorless control.

When the command speed ($\omega_r$) becomes smaller than the predetermined minimum speed ($\omega_{r\_limit}$) in section E, the control unit 130 performs forcible braking. During the forcible braking operation, the command speed ($\omega_r$) makes the PWM signal (PWMS) supplied to the motor 110 "0", and may generate a counter electromotive force in the motor 110 or may freely wheel the motor 110. Accordingly, the present speed ($\omega^\wedge_r$) of the motor 110 may quickly decrease and the motor 110 may stop.

In section E, the control unit 130 may not maintain the sensorless control. Accordingly, even though the restart command in input in the middle of section E, the motor 110 may perform a restart after the motor 110 stops because the control unit 130 may not estimate the position of magnetic polarity of the motor 110.

Section F is a section in which the motor 110 is accelerated for a restart after the motor 110 stops. In section F, the motor 110 may be accelerated in the same way that the motor 110 is accelerated in section A. In this case, a starting point of section F may be a time point at which a minimum stop period (Ts) passes after the stop command (St) is received. However, the present disclosure is not limited. The starting point of section F may be a time point at which the motor 110 completely stops.

In conclusion, the motor drive apparatus according to embodiments, may maintain sensorless control during a stop operation, and, when the restart command is received (e.g., in section C), may immediately restart the motor.

Additionally, the motor drive apparatus may reduce a section in which the sensorless control is not maintained and in which the forcible braking operation is performed (e.g., section E). When the restart command is input during the forcible braking operation, the control unit 130 may perform a restart operation after the minimum stop period passes, thereby maintaining continuity of control of the motor 110 (e.g., section E).

By doing so, the motor drive apparatus of the present disclosure may reduce time taken by the motor drive apparatus to respond to a user's request for a restart, and may improve stability in an operation of controlling the motor.

The present disclosure has been described with reference to the embodiments illustrated in the drawings. However, the disclosure may be replaced, modified and changed by one having ordinary skill in the art to which the disclosure pertains in various different forms within the scope of the technical spirit of the disclosure. Therefore, the disclosure is not limited to the embodiments and the drawings set forth herein.

The invention claimed is:

1. A motor drive apparatus, comprising:
   an inverter configured to drive a motor by using an alternating current (AC) voltage; and
   a controller configured to output a pulse width modulation (PWM) signal for controlling operation of a switching element included in the inverter,
   wherein the controller is configured to:
      based on a stop command for the motor being input, decrease a duty ratio of the PWM signal until a present speed of the motor becomes less than a predetermined minimum speed,
      based on the present speed of the motor becoming less than the predetermined minimum speed, perform a forcible braking operation of the motor,
      based on a restart command being input while decreasing the duty ratio of the PWM signal, increase the duty ratio of the PWM signal,
      based on the restart command being input during the forcible braking operation of the motor, increase the duty ratio of the PWM signal after the motor stops, perform a sensorless control of the motor while controlling the duty ratio of the PWM signal, during the sensorless control of the motor, estimate a position of magnetic polarity of the motor, and
maintain the sensorless control of the motor after the motor is stopped and to restart the motor in response to the restart command based on the estimated position of magnetic polarity of the motor.

2. The motor drive apparatus of claim 1, wherein the controller is configured to, based on the restart command being input during the forcible braking operation of the motor, increase the duty ratio of the PWM signal in response to a specific period having passed after the motor stopped.

3. The motor drive apparatus of claim 1, wherein the forcible braking operation of the motor comprises dynamic braking in which a counter electromotive force is generated in the motor, and reserve force braking in which the motor is freely wheeled.

4. The motor drive apparatus of claim 1, wherein the predetermined minimum speed is less than half of a maximum speed of the motor.

5. The motor drive apparatus of claim 1, wherein, when the stop command is input and the duty ratio of the PWM signal is decreased, magnitude of output currents of the inverter is smaller than magnitude of output currents prior to input of the stop command.

6. The motor drive apparatus of claim 1, wherein the motor comprises a stator around which three-phase coils are wound, and a rotor which is placed in the stator and is rotated by a magnetic field generated in the three-phase coils, and
the inverter comprises three-phase switching elements that perform switch-on and switch-off operations to supply three-phase AC voltages to the three-phase coils or to cut off the three-phase AC voltages.

7. The motor drive apparatus of claim 6, wherein the three-phase coils comprise:
a first-phase coil to which a first-phase AC voltage among the three-phase AC voltages is supplied,
a second-phase coil to which a second-phase AC voltage among the three-phase AC voltages is supplied, and
a third-phase coil to which a third-phase AC voltage among the three-phase AC voltages is supplied,
wherein the three-phase switching elements comprise:
a first upper arm switch and a first lower arm switch that perform switch-on and switch-off operations to be supplied with the first-phase AC voltage and that are connected in parallel with the first-phase coil,
a second upper arm switch and a second lower arm switch that perform switch-on and switch-off operations to be supplied with the second-phase AC voltage and that are connected in parallel with the second-phase coil, and
a third upper arm switch and a third lower arm switch that perform switch-on and switch-off operations to be supplied with the third-phase AC voltage and that are connected in parallel with the third-phase coil.

8. The motor drive apparatus of claim 7, wherein each of the first to third upper arm switches and the first to third lower arm switches performs switch-on and switch-off operations according to the PWM signal.

9. The motor drive apparatus of claim 7, wherein the controller is configured to, based on the present speed of the motor becoming less than the predetermined minimum speed, switch off all the first to third upper arm switches and switches-on all the first to third lower arm switches.

10. The motor drive apparatus of claim 7, wherein the controller is configured to, based on the present speed of the motor becoming less than the predetermined minimum speed, switch off all the first to third upper arm switches and all the first to third lower arm switches.

11. A motor drive apparatus, comprising:
a motor that comprises a stator around which three-phase coils are wound, and a rotor disposed in the stator and configured to be rotated by a magnetic field generated in the three-phase coils;
an inverter that comprises three-phase switching elements configured to perform switch-on and switch-off operations to supply three-phase alternating current (AC) voltages to the three-phase coils and to cut off the three-phase AC voltages; and
a controller configured to output a pulse width modulation (PWM) signal for controlling operation of the three-phase switching elements,
wherein the controller is configured to:
based on a stop command for the motor being input, decrease a duty ratio of the PWM signal until a present speed of the motor becomes smaller than a predetermined minimum speed,
based on the present speed of the motor becoming less than the predetermined minimum speed, perform a forcible braking operation of the motor,
based on a restart command being input while decreasing the duty ratio of the PWM signal, increase the duty ratio of the PWM signal,
based on the restart command being input during the forcible braking operation of the motor, increase the duty ratio of the PWM signal after the motor stops, perform a sensorless control of the motor while controlling the duty ratio of the PWM signal,
during the sensorless control of the motor, estimate a position of magnetic polarity of the motor, and
maintain the sensorless control of the motor after the motor is stopped and to restart the motor in response to the restart command based on the estimated position of magnetic polarity of the motor.

12. The motor drive apparatus of claim 11, wherein the controller is configured to, based on the restart command being input during the forcible braking operation of the motor, increase the duty ratio of the PWM signal in response to a specific period having been passed after the motor stopped.

13. The motor drive apparatus of claim 11, wherein the controller is configured to perform the forcible braking operation of the motor without the PWM signal.

14. The motor drive apparatus of claim 11, wherein the three-phase coils comprise:
a first-phase coil to which a first-phase AC voltage among the three-phase AC voltages is supplied,
a second-phase coil to which a second-phase AC voltage among the three-phase AC voltages is supplied, and
a third-phase coil to which a third-phase AC voltage among the three-phase AC voltages is supplied, and
wherein the three-phase switching elements comprise:
a first upper arm switch and a first lower arm switch that perform switch-on and switch-off operations to be supplied with the first-phase AC voltage and that are connected in parallel with the first-phase coil,
a second upper arm switch and a second lower arm switch that perform switch-on and switch-off operations to be supplied with the second-phase AC voltage and that are connected in parallel with the second-phase coil, and
a third upper arm switch and a third lower arm switch that perform switch-on and switch-off operations to be supplied with the third-phase AC voltage and that are connected in parallel with the third-phase coil.

15. The motor drive apparatus of claim 14, wherein the controller is configured to, based on the present speed of the motor becoming less than the predetermined minimum speed, switch off all the first to third upper arm switches and switches-on all the first to third lower arm switches.

16. The motor drive apparatus of claim 14, wherein the controller is configured to, based on the present speed of the motor becoming less than the predetermined minimum speed, switch off all the first to third upper arm switches and all the first to third lower arm switches.

* * * * *